May 22, 1962    B. DUBSKÝ ET AL    3,035,569
SPIROMETER
Filed Oct. 28, 1959
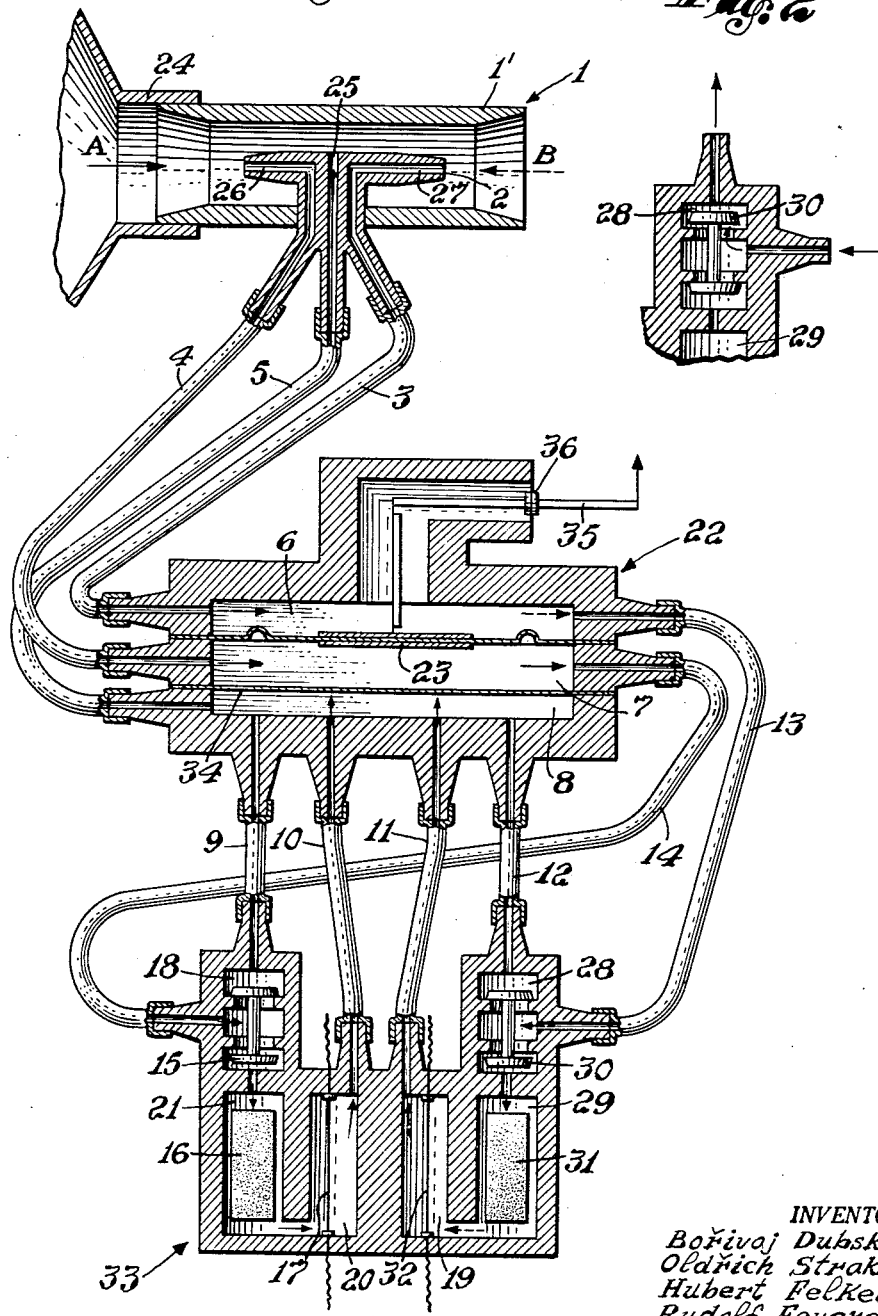
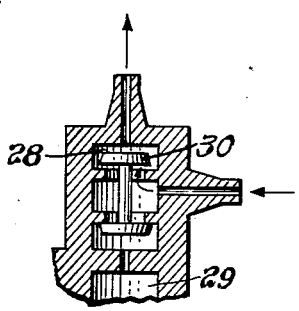
INVENTORS.
Bořivoj Dubský
Oldřich Straka
Hubert Felkel
Rudolf Feuereisl
BY Richard United States Patent Office 3,035,569
Patented May 22, 1962

3,035,569
SPIROMETER
Borivoj Dubsky, Oldrich Straka, Hubert Felkel, and Rudolf Feuereisl, Prague, Czechoslovakia, assignors to Vyzkumny a zkusebni letecky ustav, Letnany, near Prague, Czechoslovakia
Filed Oct. 28, 1959, Ser. No. 849,193
Claims priority, application Czechoslovakia Nov. 6, 1958
1 Claim. (Cl. 128—2.07)

The present invention relates to apparatus for measuring the concentration of carbon dioxide in exhaled air, and more particularly to such apparatus which may conveniently be combined with a spirograph into a single unit permitting simultaneous determination of the rate of inhalation and exhalation, and of the carbon dioxide in the exhaled air.

The operation of known apparatus for determining carbon dioxide in exhaled air is based on the fact that the heat conductivity of carbon dioxide is so much greater than that of air that even small amounts of carbon dioxide in excess of the naturally occurring amount may be reliably detected in a mixture of air and carbon dioxide by determining the heat conductivity of the mixture. The heat conductivity of the sample tested is compared with that of an air sample by means of a Wheatstone bridge arrangement. Two wires arranged in two legs of the bridge circuit are heated to incandescence in air and in the mixture, respectively. Heat losses from the wire surrounded by the mixture bearing carbon dioxide are faster, and the resulting temperature difference between the wires causes an electrical resistance difference. This difference is indicated by a suitable measuring device which may be directly calibrated in units of carbon dioxide concentration of the sample.

To produce readings of the measuring instrument which are correctly related to the carbon dioxide concentration of the tested mixture, the heat loss of the incandescent wires must be due entirely or almost entirely to the conduction of heat through the ambient gaseous atmosphere. The heat consumed for raising the temperature of the gas itself must be negligible compared with the heat loss from the wire due to conduction. In conventional apparatus of the type described, a sample stream of the mixture to be tested and a comparison sample of air are therefore fed very slowly through the chambers in which the incandescent wires are enclosed. The time required for reaching the equilibrium concentration of carbon dioxide in the test cell, which is representative of the mixture being tested, is of necessity quite long. In practice, this time may be so long that the composition of the air exhaled by the patient under test may vary significantly.

An object of the present invention is the provision of an apparatus for measuring the concentration of carbon dioxide in exhaled air, which yields correct test results in a very short time, for example, of the order of magnitude of less than one minute.

Other objects and many of the attendant advantages of this invention will be readily appreciated as the same becomes better understood by reference to the following detailed description when considered in connection with the accompanying drawing wherein:

FIG. 1 shows a preferred embodiment of the invention in an elevational sectional view; and FIG. 2 shows a detail of the apparatus of FIG. 1 in a different operational position.

Referring to the drawing in detail, there are seen the essential working elements of an apparatus for simultaneously determining the rate of breathing of a tested person and the carbon dioxide concentration in the exhaled air. The measuring and indicating or recording devices which cooperate with the working elements shown have not been illustrated since they may be entirely conventional.

The apparatus shown consists essentially of three units connected by tubing, namely, a breathing tube assembly 1, a pressure indicator assembly 22, and a gas analyzer assembly 33.

The breathing tube assembly 1 consists of a tube or conduit 1' to one end of which a mouth piece 24 is attached. A Pitot tube assembly 2 having three orifices 25, 26, 27 is mounted coaxially in the tube 1'. The orifice 26 of one Pitot tube is directed axially toward the mouthpiece 24, and the orifice 27 of another Pitot tube faces in the opposite direction. The third orifice 25 pertains to a compensating tube and faces a wall of the tube 1' in a radial direction.

The pressure indicator assembly 22 forms a rigid chamber which is divided into three compartments 6, 7, 8 by a flexible diaphragm 23 between the compartments 6 and 7, and by a thin partition wall 34 between the compartments 7 and 8. A linkage 35 is attached to the diaphragm 23 and passes outwardly of the pressure indicator assembly through a movable seal 36.

The gas analyzer assembly 33 consists of two identical units arranged in a single housing of heat-conductive material. Each unit comprises a two-way valve 18, 28 for control of the flow of gas to a drying chamber 21, 29 which communicates with a cell 20, 19. A wire 17, 32 is mounted on insulators in each cell or measuring chamber. A desiccant, such as a bag of silica gel 16, 31, is mounted in each drying chamber 21, 29.

The two-way valves 18, 28 have respective valve bodies 15, 30 which are normally held by gravity in the positions shown in FIG. 1 in which they provide a passage from respective intake tubes 14, 13 to the drying chambers 21, 29. In the other positions of the valve bodies 15, 30, which are illustrated in FIG. 2, the access to the drying chambers 21, 29 is sealed off.

Three strands of tubing 3, 4, 5 connect the three orifices of the Pitot tube assembly 2 with the three compartments in the pressure indicator assembly 22 respectively. The two compartments 6 and 7 on either side of the flexible diaphragm 23 permanently communicate with the aforementioned intake tubes 13, 14 of the two-way valves 18, 28. The third compartment 8 of the pressure indicator assembly 22 provides a manifold connection between the tubing strand 5 and the corresponding radial orifice 25 of the Pitot tube assembly 2 and each of four flexible tubes 9, 10, 11, and 12 which respectively connect the compartment 8 to one of the two alternate discharge conduits of the valve 18, the corresponding discharge conduit of the valve 28, and to the two cells 20 and 19.

In the position illustrated in FIG. 1, the valves 18, 28 are in their normal position in which they connect the tubes 14, 13 with the conductivity cells 20, 19 through the drying cells 21, 29 respectively. When in their other position, shown for valve 28 in FIG. 2, the valves block the respective conductivity cells and connect the tubes 14, 13 with the compensating manifold and thus with the orifice 25.

The device described operates as follows:

The person whose production of carbon dioxide is to be tested inhales and exhales through the tube assembly 1, thereby causing gas flow in the directions of the arrows B and A respectively. Upon inhalation, a stream of air is forced into the Pitot tube orifice 27 and through the tubes 3, 13, and the valve 28, the drying cell 29 into the conductivity chamber 20 at a rate greater than the pressure can be released from the cell through its narrow vent into the compensating manifold. Pressure thus is built up in the cell 20 until it is high enough to shift the valve 28 to the position seen in FIG. 2 whereupon the cell is closed and the remainder of the air stream is diverted to the manifold and eventually returned to the breathing tube 1. In a similar manner, the cell 19 is filled with a sample of exhaled air and closed. A comparative reading of the resistance of the wires 17 and 32 will now furnish an indication of the carbon dioxide content of the exhaled air due to the metabolism of the test person.

The dimensions of the entire apparatus can be readily held so small that the significant readings can be obtained in a matter of a few seconds. The measurement is taken while the gas samples are stationary in the respective cells and heat loss from the wires by the streaming gas is not significant. It is possible to sweep the cells at a high rate of gas movement, yet to take measurements in a stationary gas.

The assembly 22 serves several purposes. Its three compartments 6, 7, and 8 respectively provide convenient connections between the tubes 3 and 13, 5 and 14, and manifold connections between the tube 5 and the tubes 9, 10, 11 and 12. A flexible diaphragm 23 which is deflected when the pressures in the cells 6 and 7 are different actuates a linkage (no reference character) which may drive an indicating or recording device and thus may constitute a spirometer or spirograph. The cell 8 also permits thermal equilibrium to be established so as to minimize errors in measurement due to temperature differences.

What we claim is:

In an apparatus for measuring carbon dioxide in exhaled air, in combination, a conduit having an axis and two open axial ends; a mouthpiece on one of said ends; two Pitot tubes each having an orifice in said conduit axially facing a respective one of said open ends; a compensating tube having a radially facing orifice in said conduit; two measuring chambers; a heated wire in each of said chambers; and two two-way valves each connected to one of said Pitot tubes, to one of said chambers, and to said compensating tube, each valve being normally positioned to connect said one Pitot tube to said one chamber, and responsive to an excess of pressure in said chamber to connect said Pitot tube to said compensating tube.

References Cited in the file of this patent
UNITED STATES PATENTS

| | | |
|---|---|---|
| 2,633,843 | Glasser | Apr. 7, 1953 |
| 2,916,033 | Coleman | Dec. 8, 1959 |